United States Patent [19]

DeMario et al.

[11] Patent Number: 5,200,142
[45] Date of Patent: Apr. 6, 1993

[54] NUCLEAR FUEL ASSEMBLY TOP NOZZLE WITH IMPROVED PERIPHERAL HOLD-DOWN ASSEMBLY

[75] Inventors: Edmund E. DeMario, Columbia; Robert W. Cantrell, Hopkins, both of S.C.

[73] Assignee: Westinghouse Electric Corp., Pittsburgh, Pa.

[21] Appl. No.: 686,954

[22] Filed: Apr. 18, 1991

[51] Int. Cl.$^5$ .............................................. G21C 3/32
[52] U.S. Cl. ................................... 376/446; 376/364; 376/353; 376/445
[58] Field of Search ............... 376/364, 446, 285, 353, 376/362, 445; 976/DIG. 48, DIG. 66, DIG. 68

[56] References Cited

U.S. PATENT DOCUMENTS

| | | | |
|---|---|---|---|
| 4,072,562 | 2/1978 | Sankovich | 176/50 |
| 4,534,933 | 8/1985 | Gjertsen et al. | 376/364 |
| 4,671,924 | 6/1987 | Gjertsch | 376/285 |
| 4,684,502 | 12/1987 | Wilson et al. | 376/446 |
| 4,744,942 | 5/1988 | Ferrari et al. | 376/442 |
| 4,799,312 | 1/1989 | Shallenberger et al. | 29/723 |
| 5,057,272 | 10/1991 | DeMario et al. | 376/446 |

OTHER PUBLICATIONS

US Invention Registration No. H690, Published Oct. 3, 1989.

*Primary Examiner*—Donald P. Walsh
*Assistant Examiner*—Meena Chelliah

[57] ABSTRACT

A fuel assembly has a top nozzle which includes a lower adapter plate and a plurality of guide structures thereon. The lower adapter plate has a peripheral edge. The guide structures are attached to and extend upwardly from the lower adapter plate at locations spaced inwardly from the peripheral edge of the lower adapter plate so as to separate the lower adapter plate into an interior portion extending between interior sides of the guide structures and mountable to the guide thimbles and a peripheral portion extending about exterior sides of the guide structures. The guide structures define a plurality of vertical guide slots. The top nozzle also includes a peripheral hold-down assembly disposed along the peripheral portion of the lower adapter plate about the exterior sides of the guide structures and having a plurality of guide tabs movably coupled to the guide slots of the guide structures for permitting vertical movement of the hold-down assembly relative to the lower adapter plate and guide structures in providing a downward biasing force against the peripheral portion of the lower adapter plate of the top nozzle. The peripheral hold-down assembly includes a peripheral arrangement of leaf springs and an annular upper retainer member overlying the peripheral portion of the lower adapter plate and engaging the peripheral arrangement of leaf springs.

14 Claims, 7 Drawing Sheets

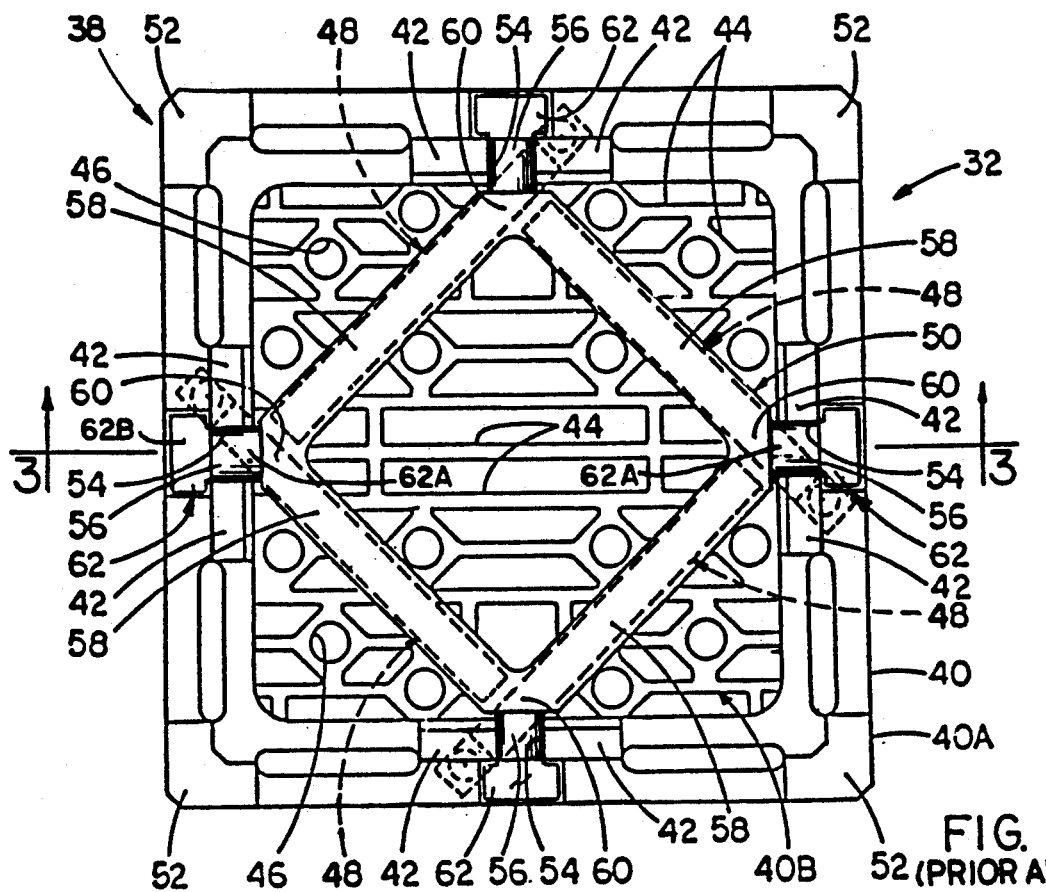
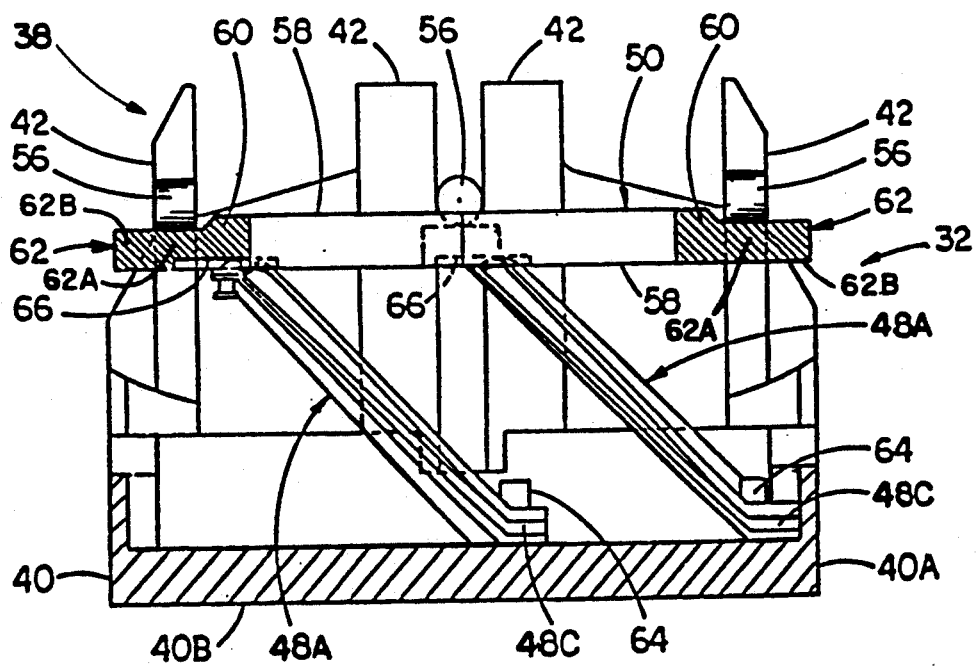
FIG. 2 (PRIOR ART)
FIG. 3 (PRIOR ART)

NUCLEAR FUEL ASSEMBLY TOP NOZZLE WITH IMPROVED PERIPHERAL HOLD-DOWN ASSEMBLY

CROSS-REFERENCE TO RELATED APPLICATION

Reference is hereby made to the following copending U. S. patent applications dealing with related subject matter and assigned to the assignee of the present invention: "Nuclear Fuel Assembly Top Nozzle With Improved Arrangement Of Hold-Down Leaf Spring Assemblies" by Edmund E. DeMario et al, assigned U.S. Pat. No. 5,057,272 and filed Dec. 1, 1989. (W.E. 55,427)

BACKGROUND OF THE INVENTION

1. Field of the Invention

The present invention relates generally to nuclear fuel assemblies for a nuclear reactor and, more particularly, is concerned with a fuel assembly top nozzle incorporating an improved peripheral hold-down assembly.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle.

In the conventional fuel assembly, coolant flowing upward past the fuel rods and guide thimbles induces significant upward forces. These forces are countered by a combination of the weight of the fuel assembly and a resiliently yieldable hold-down assembly on the top nozzle which pushes against the upper core plate of the reactor. The hold-down assembly thereby provides a downward force which counteracts and prevents the force of the upward coolant flow from lifting the fuel assembly into damaging contact with the upper core plate, while allowing for changes in fuel assembly length due to core induced thermal expansion and the like.

One prior art hold-down assembly employs a single large diameter helical coil spring centrally in the top nozzle to hold down the fuel assembly. The single coil spring used in this one prior art hold-down assembly has a tendency to fracture and fail due to vibration induced by coolant flow through the fuel assembly. Also, because of its susceptibility to failure, the single coil spring cannot withstand the large loads imposed on it when the flow of coolant increases due to activation of a final, or fourth, reactor coolant pump. As a result, the nuclear power plant operator must refrain from activating the last pump until the coolant reaches its start-up temperature of 450°-550° F., when the density of the coolant is less than at a lower temperature.

An improved hold-down assembly requiring only minimal modification of the overall top nozzle structure is proposed in the U. S. patent application cross-referenced above. In this improved hold-down assembly, the central coil spring is advantageously replaced by a diagonal arrangement of leaf springs which can withstand greater strain than the single coil spring and are not susceptible to failure caused by flow-induced vibration. The plant operator can now activate the fourth coolant pump for operation at higher coolant density and thus at lower coolant temperatures, for example, 300° F.

However, one drawback of this improved hold-down assembly is that the diagonal springs and upper hold-down or retainer plate are positioned across the interior of the top nozzle where they obstruct coolant flow upwardly through holes defined in the adapter plate of the top nozzle. This arrangement results in a decrease in flow rate and increase in pressure drop of coolant flow through the top nozzle.

Consequently, a need still exists for an alternative design of a hold-down assembly to overcome the remaining problems described above without requiring a significant modification of the overall top nozzle structure.

SUMMARY OF THE INVENTION

The present invention provides an improved peripheral hold-down assembly designed to satisfy the aforementioned needs. The peripheral hold-down assembly of the invention eliminates the problems associated with the prior art hold-down assemblies by locating an annular bearing, or retainer, member and an arrangement of leaf springs about a peripheral portion of a lower adapter plate of the top nozzle while requiring only minimal modification of the overall top nozzle structure. The retainer member overlies and captures the leaf springs to position, protect and guide them and thereby prevent them from moving either inwardly or outwardly where they would interfere with other components of the fuel assembly and other operations being performed in the fuel assembly.

Accordingly, the present invention is directed to a top nozzle useful in a fuel assembly having a plurality of guide thimbles for mounting the top nozzle. The top nozzle comprises the combination of: (a) a lower adapter plate mountable to the guide thimbles and having a peripheral edge; (b) a plurality of guide structures attached to and extending upwardly from the lower adapter plate at locations spaced inwardly from the peripheral edge of the lower adapter plate so as to separate the lower adapter plate into an interior portion extending between interior sides of the guide structures and mountable to the guide thimbles and a peripheral portion extending about exterior sides of the guide structures, the guide structures defining a plurality of vertically-extending first guide elements; and (c) a peripheral hold-down assembly disposed along the peripheral portion of the lower adapter plate about the exterior sides of the guide structures and having a plurality of second guide elements movably coupled to the first guide elements of the guide structures for permitting vertical movement of the hold-down assembly relative to the lower adapter plate and guide structures in providing a downward biasing force against the peripheral portion of the lower adapter plate of the top nozzle.

More particularly, the hold-down assembly includes a peripheral arrangement of leaf springs overlying and extending along the peripheral portion of the lower adapter plate, and an upper annular retainer member overlying the peripheral portion of the lower adapter plate and overlying and engaging the peripheral arrangement of leaf springs. The retainer member has a substantially rectangular shape and includes a plurality of rigidly interconnected side walls defining a plurality of corners. The side walls define a lower annular rim capable of encompassing and of movement past the peripheral edge of the lower adapter plate as the retainer member moves downwardly toward the lower adapter plate.

The second guide elements are a plurality of tabs mounted on the side walls of the retainer member and located approximately midway between the corners thereof and projecting above the peripheral portion of the adapter plate and toward the interior portion of the lower adapter plate. The first guide elements of the guide structures are vertically-extending slots spaced approximately ninety degrees from one another. The guide tabs of the retainer member are aligned with and extend through the slots of the guide structures for reguiding vertical movement of the retainer member relative to the guide structures and lower adapter plate.

Also, retainer member includes first stop elements in the form of pins projecting inwardly from corners of the retainer member. The guide structures includes second stop elements in the form of vertical slots defined in the guide structures adjacent the corners of the retainer member and receiving the pins of the retainer member so as to limit vertical movement of the retainer member away from the lower adapter plate.

Further, the leaf springs of the peripheral arrangement have lower and upper opposite ends. The leaf springs at their lower ends are attached to the lower adapter plate adjacent the corners thereof. The leaf springs extend in inclined relation to the lower adapter plate along the peripheral portion between the respective corners of the lower adapter plate. The leaf springs at their upper ends are spaced above the lower adapter plate. The retainer member adjacent corners defined by its sidewalls includes ledge portions attached to the sidewalls and projecting inwardly therefrom above the peripheral portion of the lower adapter plate. The ledge portions define recesses facing toward the lower adapter plate which receive the upper ends of the leaf springs.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged top plan view of the top nozzle of the fuel assembly of FIG. 1, illustrating a non-peripheral upper hold-down plate and diagonal arrangement of leaf springs of the non-peripheral hold-down assembly.

FIG. 3 is a cross-sectional view of the top nozzle taken along line 3—3 of FIG. 2.

DETAILED DESCRIPTION OF THE INVENTION

Figure 1:
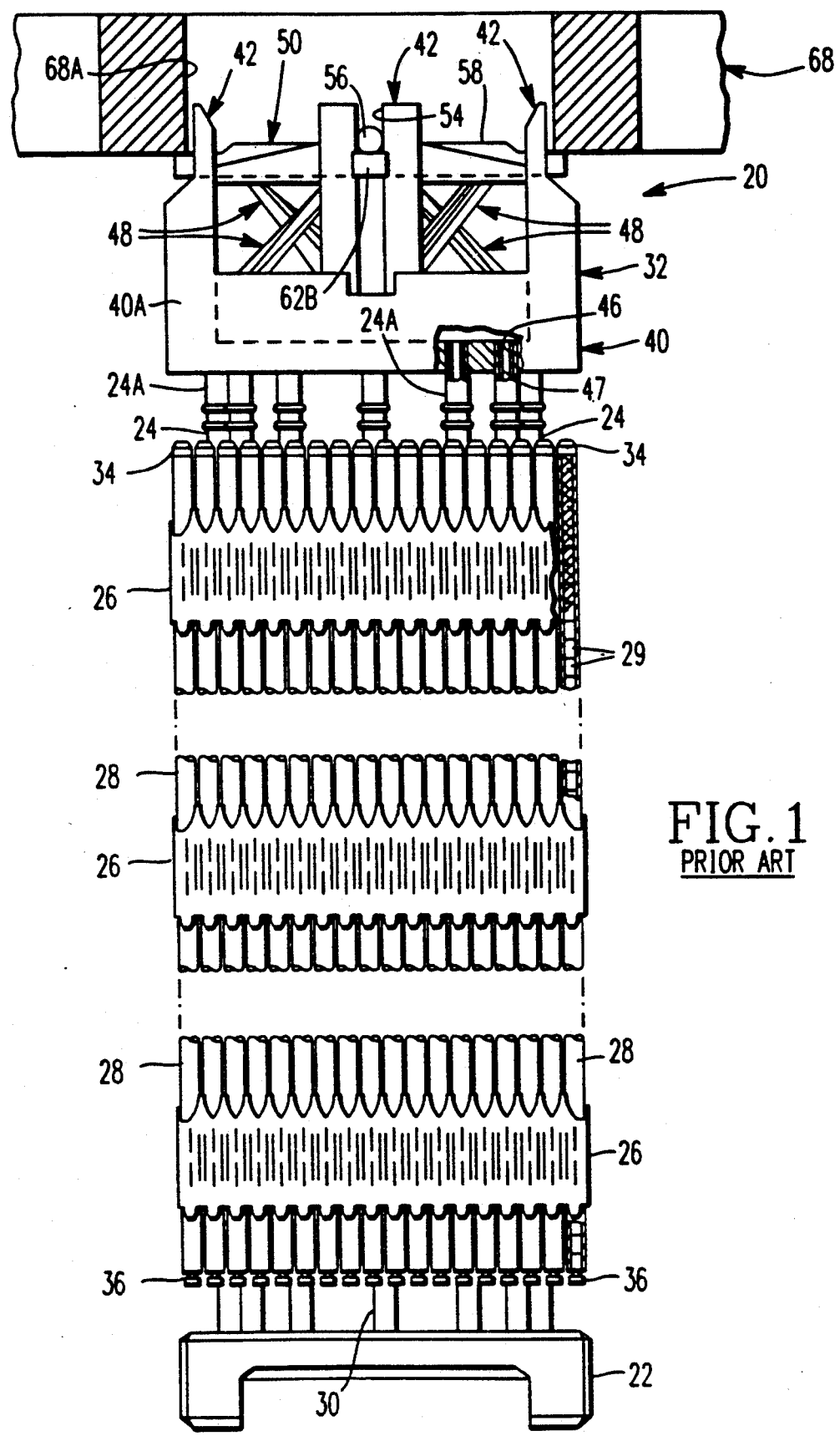
FIG. 1 is an elevational view, partly in section, of a prior art fuel assembly illustrated in vertically foreshortened form with parts broken away for clarity, the fuel assembly including a non-peripheral hold-down assembly as disclosed, in the U.S. patent application cross-referenced above.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically, or longitudinally, foreshortened form and being generally designated by the numeral 20. The fuel assembly 20 basically includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets 29 and is closed at its opposite ends by upper and lower end plugs 34, 36 to hermetically seal the rod. The fuel pellets 29 composed of fissile material are responsible for creating the reactive power of the reactor. A liquid moderator/coolant such as water, or water containing boron, is pumped upwardly through the guide thimbles 24 and along the fuel rods 28 of the fuel assembly in order to extract heat generated therein for the production of useful work.

To control the fission process, a number of control rods (not shown) are reciprocally movable in the guide thimbles 24 located at predetermined positions in the fuel assembly 20. Since the control rods are inserted into the guide thimbles 24 from the top of the fuel assembly 20, the placement of the components forming the top nozzle 32 must accommodate the movement of the control rods into the guide thimbles 24 from above the top nozzle.

Prior Art Non-Peripheral Hold-Down Assembly

Referring now to FIGS. 2 and 3 as well as to FIG. 1, a prior art non-peripheral hold-down assembly 38, as disclosed in the U. S. patent application cross-referenced above, is disposed on the top nozzle 32 of the fuel assembly 20. The top nozzle 32 includes a lower adapter plate 40 and a plurality of guide structures 42 attached to and extending along and upwardly from the periphery 40A of the lower plate 40. The periphery 40A of the lower plate 40 bounds an interior 40B of the lower plate having coolant flow openings 44 defined therein and also attachment openings 46 formed therein. The attachment openings 46 receive the upper end portions 24A of the guide thimbles 24 through which can extend the control rods (not shown) mentioned above. Preferably, as seen in FIG. 1, the top nozzle 32 is reconstitutable by the use of removable locking tubes 47 to detachably attach the upper adapter plate 40 to the upper end portions 24A of the guide thimbles 24.

As disclosed in the cross-referenced U.S. patent application, the non-peripheral hold-down assembly 38 incorporated by the top nozzle 32 includes a plurality of leaf springs 48 and an upper hold-down, bearing, or retainer, plate 50 mounted to the upstanding guide structures 42 for slidable movement relative thereto. The upper retainer plate 50 is also movable in rectilinear fashion within the space bounded by the guide structures 42 above the lower adapter plate 40 toward and away from the interior 40B of the lower plate 40 as it moves along the guide structures 42. The leaf springs 48 incorporated by the top nozzle 32 are interposed between and engaged with the lower adapter plate 40 and upper retainer plate 50 so as to yieldably support the upper plate 50 in spaced relation above the lower plate 40 and bias the upper plate 50 for movement away from the lower plate 40. The leaf springs 48 are provided in a unique non-peripheral arrangement relative to the periphery 40A of the lower adapter plate 40. In such an arrangement, the leaf springs 48 cross the interior 40B of the lower plate 40 in a diagonal-like, but non-intersecting, fashion between adjacent ones of the guide structures 42.

More particularly, the lower adapter plate 40 of the top nozzle 32 is generally rectangular-shaped and has corners 52 displaced approximately ninety degrees from one another with portions of the periphery 40A of the lower plate 40 extending between and interconnecting the corners 52. The guide structures 42 are attached to and extend upwardly from the portions of the lower plate periphery 40A extending between the lower plate corners 52 and thus are spaced substantially ninety degrees from one another also. The guide structures 42 respectively define vertically-extending slots 54. Closure means or stops 56, such as in the form of pins, are disposed in the upper ends of the slots 54 and fixed, such as by being welded, to the respective guide structure portions defining the slots.

The upper retainer plate 50 of the top nozzle 32 is a generally rectangular- or diamond-shaped ring-like structure and composed of a plurality of generally linearly-extending ligaments 58 being rigidly interconnected at opposite ends to define a plurality of corners 60. The upper plate 50 also includes a plurality of extension tabs 62 attached to the corners 60 thereof and extending outwardly therefrom and within the plane of the ligaments 58. The extension tabs 62 on the upper plate corners 60 extend through the respective slots 56 of the guide structures 42 and slidably move vertically therealong as the upper plate 50 is moved toward and away from the lower plate interior 40B. As best shown in FIGS. 1 to 3, inner portions 62A of the extension tabs 62 which extend through the slots 54 are smaller in width than outer end portions 62B thereof which are located along the exterior of the guide structures 42. Thus, the reduced width inner portions 62A of the tabs 62 slide within the slots 54. The pin-like stops 56 fixed across and thus closing the upper ends of the slots 54. limit the extent of upward movement of the extension tabs 62 along the slots 54 and thereby prevent disassembly of the upper hold-down plate 50 from the guide structures 42. The manner in which the upper plate 50 mounts to the guide structures 42 and fits within the space bounded by the guide structures 42 displaces the ligaments 58 of the upper plate 50 from the respective corners 52 of the lower plate 40 such that the ligaments 58 extend across the interior 40B of the lower plate 40 more or less diagonally and between adjacent ones of the guide structures 42. Thus, the corners 60 on the periphery of the upper plate 50 are not vertically aligned with the corners 52 on the periphery 40A of the lower plate 40; instead, the respective sets of corners 60, 52 are laterally offset or spaced from each other.

The leaf springs 48 are provided in separate stacks 48A thereof. The leaf springs 48 of each stack 48A have upper and lower ends 48B, 48C. The leaf spring stacks 48A are attached at the lower end 48C by a fastener 64, such as a threaded bolt, to the periphery 40A of the lower adapter plate 40 adjacent one of the guide structures 42 and below one of the corner 60 on the upper hold-down plate 50. Each leaf spring stack 48A is movably coupled at the upper end 48B to the upper plate 50 adjacent the next one of the corners 60 on the upper plate periphery. When in its extended condition, as seen in FIG. 3, each leaf spring stack 48A extends in inclined fashion between the pairs of adjacent corners 60 of the upper plate 50 and in alignment with the one of the ligaments 58 of the upper plate 50 extending between the adjacent corners 60. Guide means in the form of recesses or grooves 66 are defined in the underside of the upper plate 50 at the corners 60 thereof for coupling with the upper ends 38B of the leaf spring stacks 48A so as to prevent lateral swinging of the stacks 48A from under the upper plate 50. FIGS. 1 and 3 depict the leaf spring stacks 48A in their respective maximum expanded condition.

It will be readily observed that the leaf spring stacks 48A are also arranged in a single file, non-intersecting fashion with one another extending between each pair of succeeding corners 60 on the periphery of the upper retainer plate 50. The leaf spring stacks 48A are arranged along and below the ligaments 58 of the upper plate 50 and engaged with the lower and upper plates 40, 50 so as to bias the upper retainer plate 50 in an upward direction and thereby impose a hold-down force on the fuel assembly 20 via the lower adapter plate 40 which tends to displace the upper plate 50 to its upper limit along the guide structures 42. As shown in FIG. 1, the upper ends 42A of the guide structures 42 extend within a recess 68A defined in the upper core plate 68 of the nuclear reactor and the force of the leaf springs 48 biasing the upper retainer plate 50 away from the lower adapter plate 40 maintains the upper plate 50 at the outer end portions 62B of its extension tabs 62 in engagement with the underside of the upper core plate 68.

Improved Peripheral Hold-Down Assembly of the Present Invention

Figure 7:
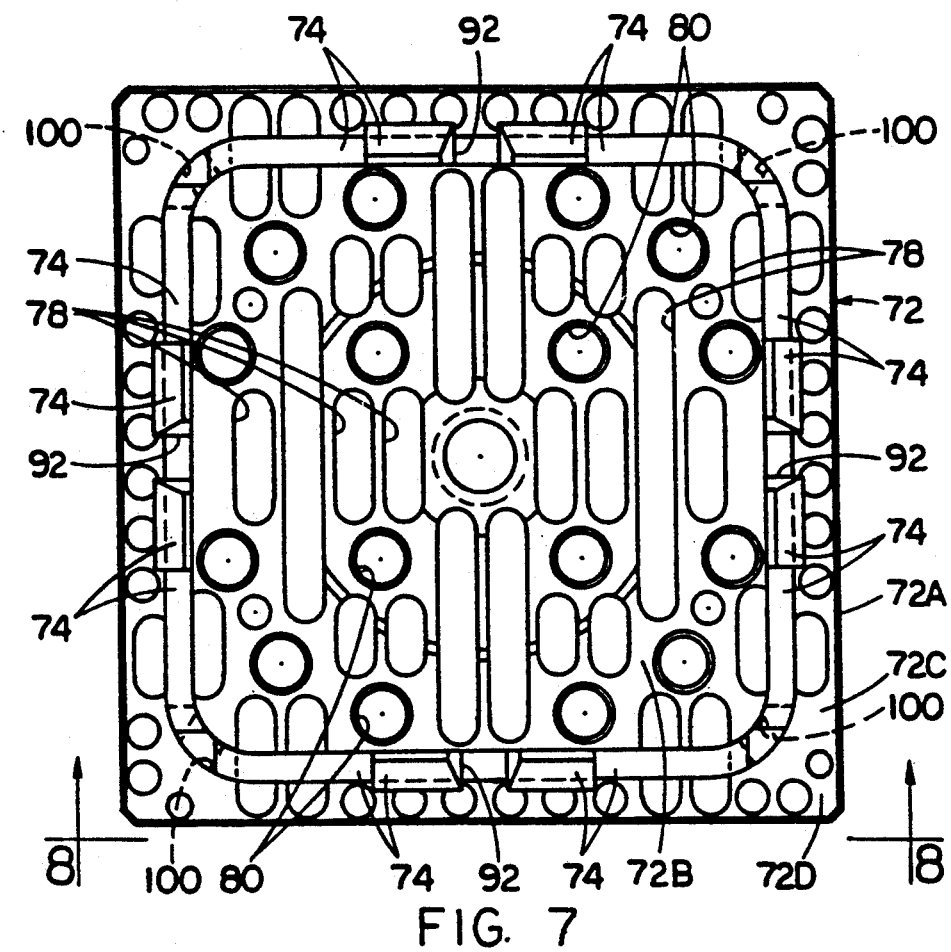
FIG. 7 is a top plan view similar to FIG. 4, but with the peripheral hold-down assembly removed.
Figure 9:
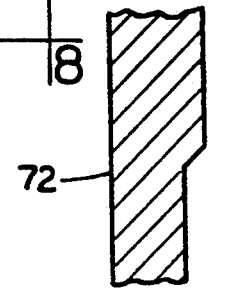
FIG. 9 is an enlarged fragmentary cross-sectional view of the lower adapter plate of the top nozzle taken along line 9—9 of FIG. 8.
Figure 8:
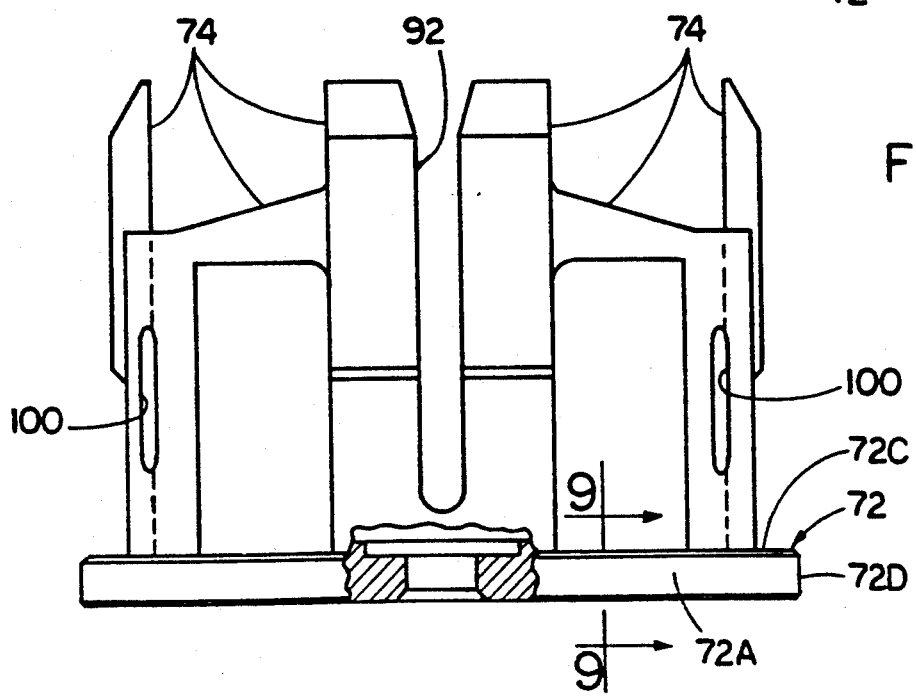
FIG. 8 is a side elevational view of the top nozzle as seen along line 8—8 of FIG. 7.
Figure 10:
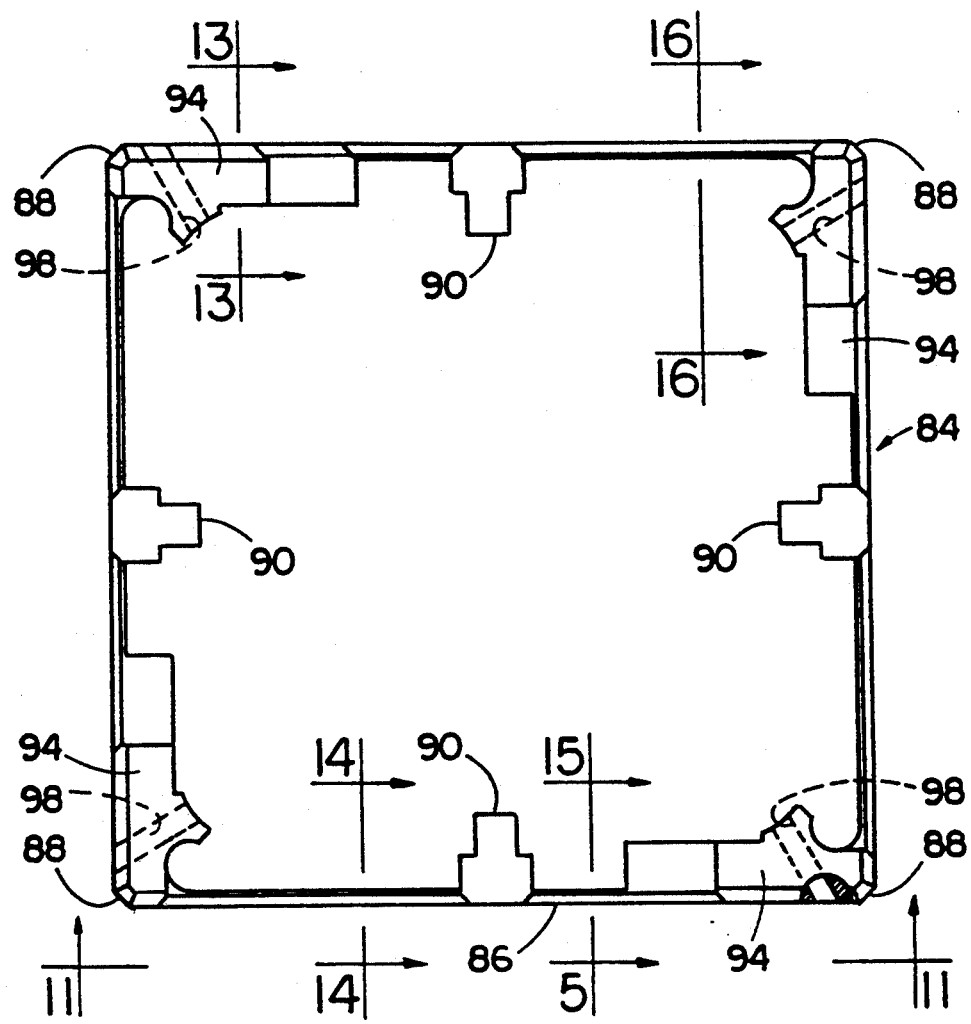
FIG. 10 is a top plan view of the upper annular retainer member of the peripheral hold-down assembly of FIG. 4.
Figure 11:
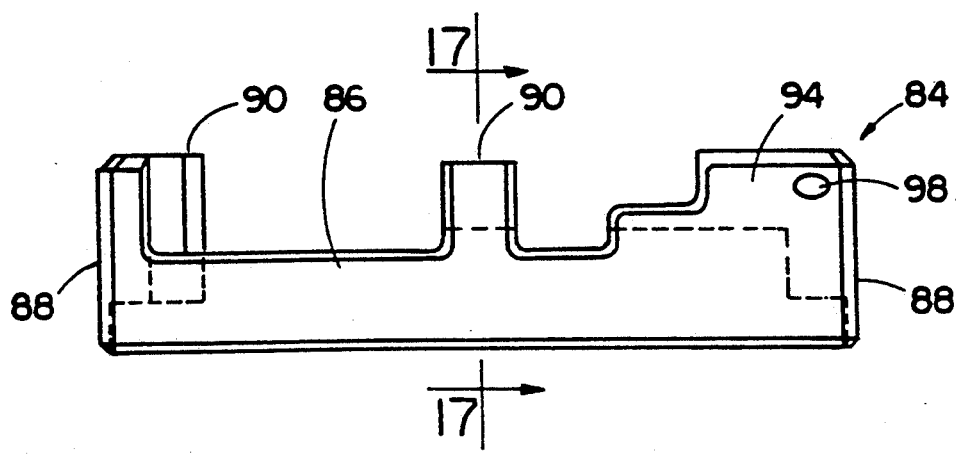
FIG. 11 is a side elevational view of the retainer member as seen along line 11—11 of FIG. 10.
Figure 12:
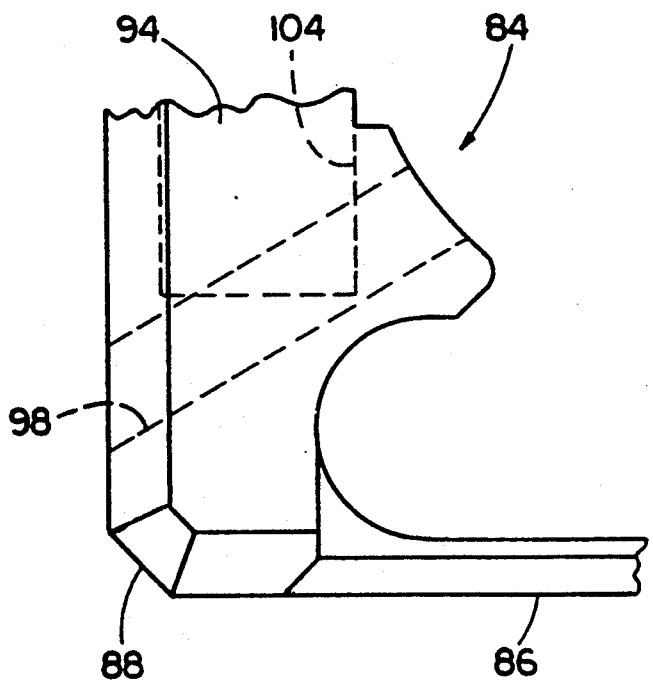
FIG. 12 is an enlarged top plan view of the lower left corner portion of the retainer member shown in FIG. 10.
Figure 13:
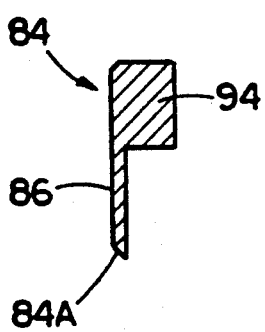
FIG. 13 is a cross-sectional view of the retainer member taken along line 13—13 of FIG. 10.
Figure 14:
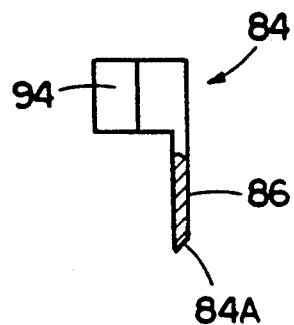
FIG. 14 is another cross-sectional view of the retainer member taken along line 14—14 of FIG. 10.
Figure 17:
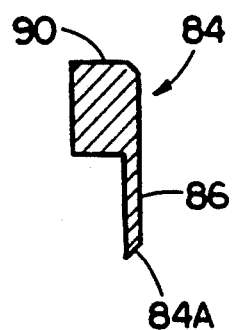
FIG. 17 is a cross sectional view of the retainer member taken along line 17—17 of FIG. 11.
Figure 15:
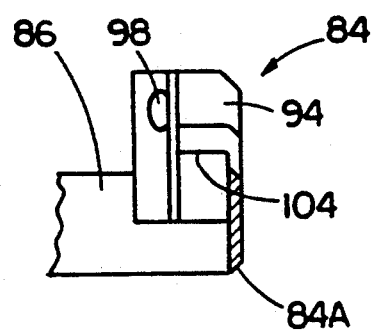
FIG. 15 is a still another cross-sectional view of the retainer member taken along line 15—15 of FIG. 10.
Figure 16:
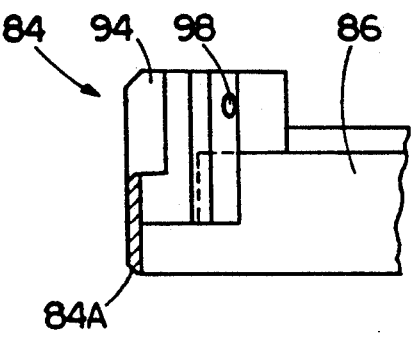
FIG. 16 is a further cross-sectional view of the retainer member taken along line 16—16 of FIG. 10.

Turning now to FIGS. 4-8, 10 and 11, there is illustrated an improved top nozzle, generally designated 70, which includes a lower adapter plate 72, a plurality of upright guide structures 74, and an upper peripheral hold-down assembly 76. The lower adapter plate 72 and guide structures 74 are substantially the same as shown in the prior art top nozzle 20 of FIGS. 1-3 except that the guide structures 74 are now attached to and extending upwardly from the lower adapter plate 72 at locations spaced inwardly from a peripheral edge 72A of the adapter plate. As best seen in FIGS. 7 and 8, at such position, the guide structures 74 separate the lower adapter plate 72 into an interior portion 72B and a peripheral portion 72C. The interior portion 72B of the lower adapter plate 72 extends between and is generally surrounded by interior sides of the guide structures 74. The interior portion 72B contains coolant flow openings 78 and guide thimble attachment openings 80 similar to the interior 40B of the prior art adapter plate 40. The peripheral portion 72C of the lower adapter plate 72 extends about exterior sides of the guide structures 74 from the guide structures 74 to the peripheral edge 72A of the adapter plate 72.

The peripheral hold-down assembly 76 of the top nozzle 70 is disposed along the peripheral portion 72C of the lower adapter plate 72 and about the exterior sides of the guide structures 74. The hold-down assembly 76 is capable of undergoing vertical movement relative to the lower adapter plate 72 and upright guide structures 74 in providing a downward biasing force against the peripheral portion 72C of the lower adapter plate 72 of the top nozzle 70. The hold-down assembly 76 includes a peripheral arrangement of stacked leaf springs 82 overlying and extending along the peripheral portion 72C of the lower adapter plate 72, and an upper annular retainer member 84 overlying the peripheral portion 72C of the lower adapter plate 72 and overlying and engaging the peripheral arrangement of stacked leaf springs 82.

Referring to FIGS. 4-6 and 10-17, the annular retainer member 84 preferably has a substantially rectangular shape and includes a plurality of rigidly interconnected side walls 86 defining a plurality of corners 88. The side walls 86 define a lower annular rim 84A on the upper retainer member 84 which is capable of encompassing and of movement past the peripheral edge 72A of the lower adapter plate 72 as the retainer member 84 moves downwardly toward the adapter plate.

The retainer member 84 also includes a plurality of guide tabs 90 mounted on the side walls 86 at locations approximately midway between the corners 88 thereof and projecting inwardly above the peripheral portion 72C of the lower adapter plate 72 and toward the interior portion 72B of the adapter plate. The upright guide structures 74 have vertically-extending guide slots 92 spaced approximately ninety degrees from one another. The guide tabs 90 of the upper retainer member 84 are aligned with and extend through the guide slots 92 of the upright guide structures 74 for guiding the vertical movement of the retainer member 84 relative to the guide structures 74 and lower adapter plate 72 in providing a downward biasing force via the stacked leaf springs 82 against the peripheral portion 72C of the lower adapter plate 72 of the top nozzle 70.

Also, upper retainer member 84 includes ledge portions 94 located adjacent the corners 88 defined by its sidewalls 86. The ledge portions 94 are attached to the sidewalls 86 and project inwardly therefrom above the peripheral portion 72C of the lower adapter plate 72. The retainer member 84 further has stop elements in the form of pins 96 fixed in openings 98 through the ledge portions 94. The stop pins 96 project inwardly and diagonally from the corners 88 of the retainer member 84. The upright guide structures 74 have stop elements in the form of vertical slots 100 located adjacent the corners 88 of the retainer member 84. As seen in FIG. 8, the slots 100 are closed at their opposite ends. The stop slots 100 receive the stop pins 96 of the retainer member 84 and serve to limit the upward vertical movement of the retainer member 84 away from the lower adapter plate 72.

The stacked leaf springs 82 of the peripheral arrangement have lower and upper opposite ends 82A, 82B. The leaf springs 82 at their lower ends 82A are attached by suitable fasteners, such as screws 102, to the lower adapter plate 72 adjacent the corners 72D thereof. The leaf springs 82 extend in inclined relation to the lower adapter plate 72 along the peripheral portion 72C thereof between the respective corners 72D. The leaf springs 82 at their upper ends 82B are spaced above the lower adapter plate 72. The ledge portions 94 of the retainer member 84 define recesses 104 which face toward the lower adapter plate 72 and receive and capture the upper ends 82B of the respective stacks of leaf springs 82.

Figure 4:
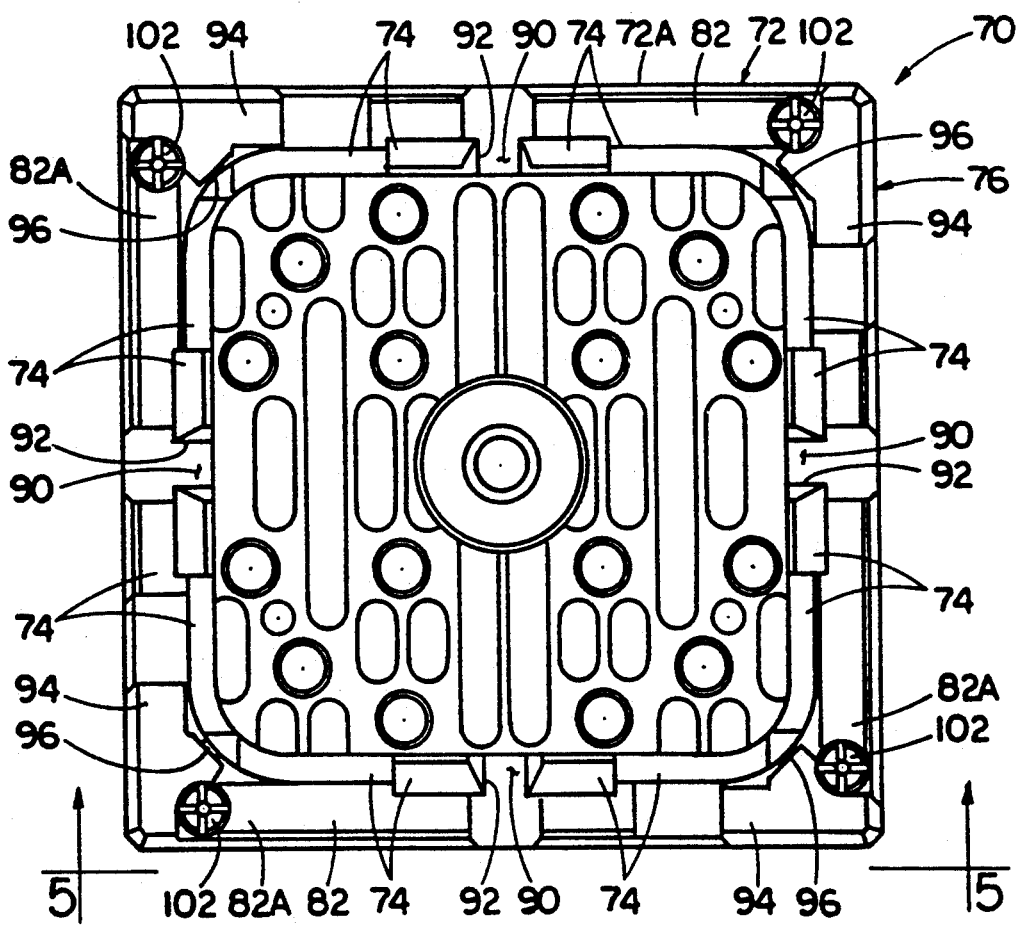
FIG. 4 is an enlarged top plan view of the top nozzle of the fuel assembly of FIG. 1, illustrating a peripheral hold-down assembly of the present invention incorporated in the fuel assembly top nozzle.
Figure 5:
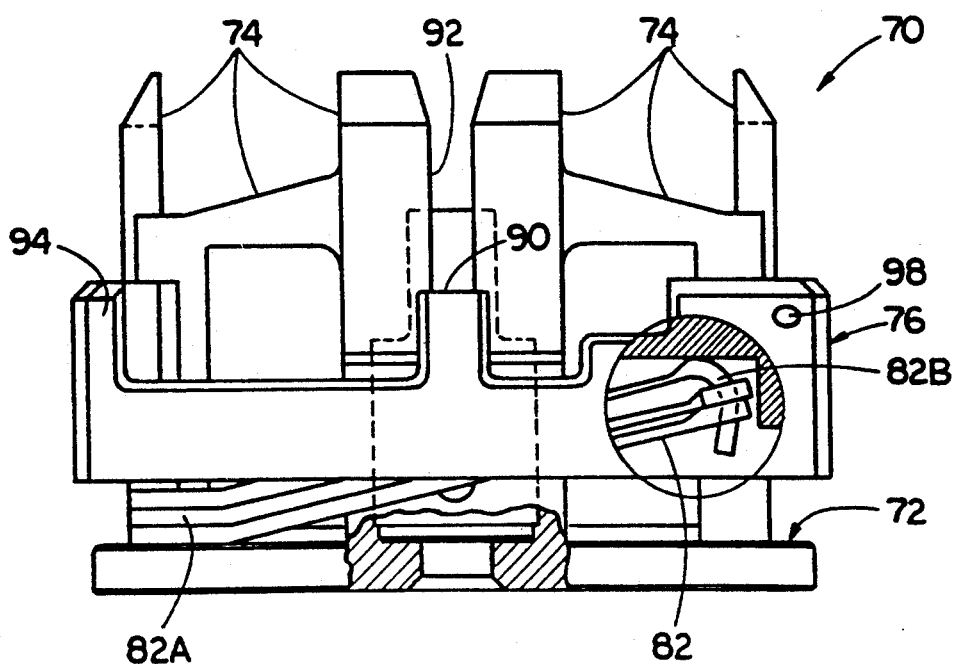
FIG. 5 is a side elevational view of the top nozzle as seen along line 5—5 of FIG. 4 illustrating the peripheral hold-down assembly of the present invention in an expanded condition.
Figure 6:
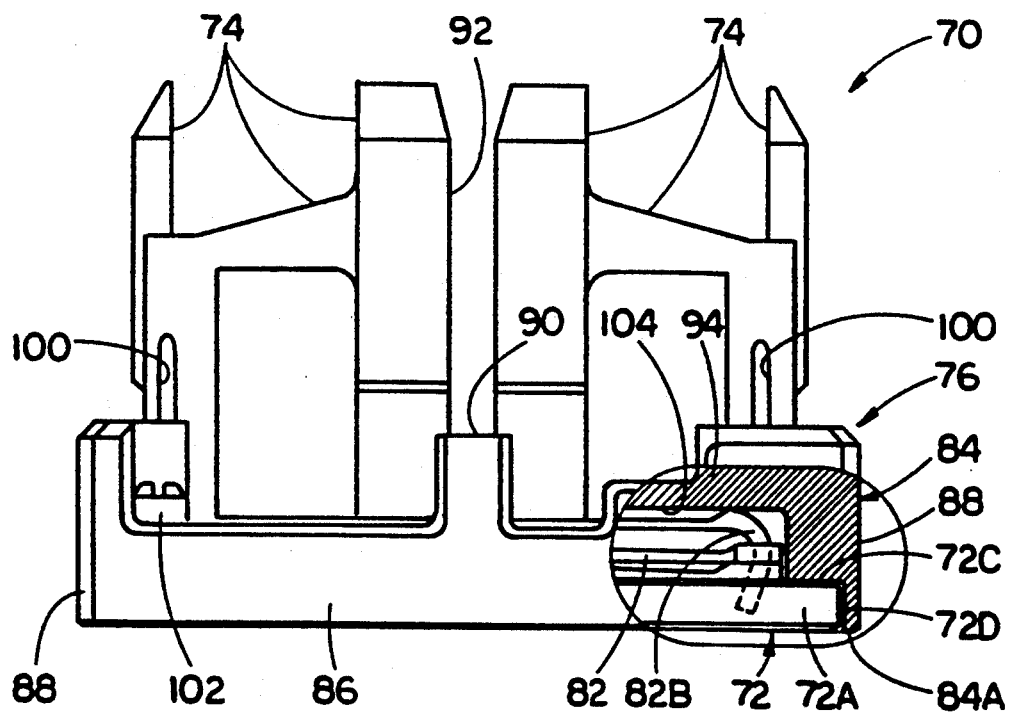
FIG. 6 is a view similar to that of FIG. 5 illustrating the peripheral hold-down assembly in a compressed condition.

It can be readily observed by comparing the prior art top nozzle 20 of FIG. 2 with the improved top nozzle 70 of FIG. 4, that the peripheral hold-down assembly of the invention eliminates the problems associated with the prior art hold-down assemblies by locating the upper retainer member 84 and the arrangement of leaf springs 82 about the peripheral portion 72C of the lower adapter plate 72 of the top nozzle while requiring only minimal modification of the overall top nozzle structure. The retainer member 84 overlies and captures the leaf springs 82 to position, protect and guide them and thereby prevent them from moving either inwardly or outwardly where they would interfere with other components of the fuel assembly and other operations being performed in the fuel assembly. The hold-down assembly 76 does not now overlie any of the interior portion 72B of the lower adapter plate 72.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. In a top nozzle for use in a fuel assembly having a plurality of guide thimbles for mounting said top nozzle, the combination comprising:
    (a) a lower adapter plate mountable to the guide thimbles and having a peripheral edge;
    (b) a plurality of guide structures attached to and extending upwardly from said lower adapter plate at locations spaced inwardly from said peripheral edge of said lower adapter plate so as to separate said lower adapter plate into an interior portion extending between interior sides of said guide structures and mountable to said guide thimbles and a peripheral portion extending about exterior sides of said guide structures, said guide structures defining a plurality of vertically-extending first guide elements; and
    (c) a peripheral hold-down assembly disposed along said peripheral portion of said lower adapter plate about said exterior sides of said guide structures and having a plurality of second guide elements movably coupled to said first guide elements of said guide structures for permitting vertical movement of said hold-down assembly relative to said lower adapter plate and guide structures in providing a downward biasing force against said peripheral portion of said lower adapter plate of said top nozzle;
    (d) said peripheral hold-down assembly including
        (i) a peripheral arrangement of leaf springs overlying and extending along said peripheral portion of said lower adapter plate, and
        (ii) an upper annular retainer member solely overlying and extending along said peripheral portion of said lower adapter plate and overlying and engaging said peripheral arrangement of leaf springs, said upper annular retainer member being separate from said lower adapter plate and capable of undergoing vertical movement relative to said lower adapter plate and said guide structures so as to provide a downward biasing force via said leaf springs against said peripheral portion of said lower adapter plate.

2. The top nozzle as recited in claim 1, wherein said lower adapter plate has a substantially rectangular shape, said peripheral portion of said lower adapter plate having a plurality of corners.

3. The top nozzle as recited in claim 2, wherein said leaf springs have lower and upper opposite ends, said leaf springs at their lower ends being attached to said lower adapter plate adjacent said corners thereof, said leaf springs extending in inclined relation to said lower adapter plate along said peripheral portion between said respective corners thereof, said leaf springs at their upper ends being spaced above said lower adapter plate.

4. The top nozzle as recited in claim 1, wherein said retainer member has a substantially rectangular shape and includes a plurality of rigidly interconnected side walls defining a plurality of corners.

5. The top nozzle as recited in claim 4 wherein said side walls define a lower annular rim on said retainer member capable of encompassing and of movement past said peripheral edge of said lower adapter plate as said retainer member moves downwardly toward said lower adapter plate.

6. The top nozzle as recited in claim 4, wherein said second guide elements of said hold-down assembly are a plurality of tabs mounted on said side walls of said retainer member and located approximately midway between said corners thereof and projecting above said peripheral portion of said adapter plate and toward said interior portion of said lower adapter plate.

7. The top nozzle as recited in claim 6, wherein said first guide elements of said guide structures are vertically-extending slots spaced approximately ninety degrees from one another, said guide tabs of said retainer member being aligned with and extend through said slots of said guide structures for guiding vertical movement of said retainer member relative to said guide structures and said lower adapter plate.

8. The top nozzle as recited in claim 4, wherein:
    said retainer member includes first stop elements; and
    said guide structures includes second stop elements coupled with said first stop elements of said retainer member so as to limit vertical movement of said retainer member away from said lower adapter plate.

9. The top nozzle as recited in claim 8, wherein: said first stop elements are pins projecting inwardly from said retainer member at said corners thereof; and
    said second stop elements are vertically-extending slots defined in said guide structures adjacent said corners of said retainer member.

10. The top nozzle as recited in claim 4, wherein said lower adapter plate has a substantially rectangular shape, said peripheral portion of said lower adapter plate having a plurality of corners.

11. The top nozzle as recited in claim 10, wherein said leaf springs have lower and upper opposite ends, said leaf springs at their lower ends being attached to said lower adapter plate adjacent said corners thereof, said leaf springs extending in inclined relation to said lower adapter plate along said peripheral portion between said respective corners thereof, said leaf springs at their upper ends being spaced above said lower adapter plate.

12. The top nozzle as recited in claim 11, wherein said retainer member adjacent said corners defined by said sidewalls thereof includes ledge portions attached to said sidewalls and projecting inwardly therefrom above said peripheral portion of said lower adapter plate, said ledge portions defining recesses facing toward said lower adapter plate which receive said upper ends of said leaf springs.

13. The top nozzle as recited in claim 12, wherein:
    said retainer member includes first stop elements located adjacent said corners thereof; and
    said guide structures includes second stop elements coupled with said first stop elements of said retainer member so as to limit the vertical movement of said retainer member away from said lower adapter plate.

14. The top nozzle as recited in claim 13, wherein:
    said first stop elements are pins projecting inwardly from said retainer member at said corners thereof; and
    said second stop elements are vertically-extending slots defined in said guide structures adjacent said corners of said retainer member.

* * * * *